（12）United States Patent
Shimada et al.

(10) Patent No.: US 9,221,391 B2
(45) Date of Patent: Dec. 29, 2015

(54) VEHICLE TURN SIGNAL SWITCH DEVICE

(75) Inventors: Masahiko Shimada, Wako (JP);
Masatsugu Urakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 14/344,090

(22) PCT Filed: Jul. 9, 2012

(86) PCT No.: PCT/JP2012/067447
§ 371 (c)(1),
(2), (4) Date: Mar. 11, 2014

(87) PCT Pub. No.: WO2013/038786
PCT Pub. Date: Mar. 21, 2013

(65) Prior Publication Data
US 2015/0137964 A1   May 21, 2015

(30) Foreign Application Priority Data

Sep. 13, 2011   (JP) .................................. 2011-200022

(51) Int. Cl.
*B60Q 1/40* (2006.01)
*B60Q 1/42* (2006.01)
*B60Q 1/00* (2006.01)
*H01H 3/42* (2006.01)

(52) U.S. Cl.
CPC ................ *B60Q 1/42* (2013.01); *B60Q 1/0076* (2013.01); *B60Q 1/425* (2013.01); *H01H 3/42* (2013.01)

(58) Field of Classification Search
CPC ......... B60Q 1/425; B60Q 1/0076; H01H 3/43
USPC ............................... 340/425.5, 435, 436, 476
See application file for complete search history.

(56) References Cited

U.S. PATENT DOCUMENTS

2002/0100668 A1 * 8/2002 Ito .................................. 200/61.3
2011/0127148 A1   6/2011 Kaburagi et al.

FOREIGN PATENT DOCUMENTS

| EP | 1060949 A2 | 12/2000 |
| FR | 2246171 A5 | 4/1975 |
| JP | H05-041967 | 6/1993 |
| JP | 08-167345 | 6/1996 |
| JP | 11-219641 | 8/1999 |
| JP | 2011-126407 | 6/2011 |

OTHER PUBLICATIONS

European Search Report dated Jun. 22, 2015, 6 pages.

* cited by examiner

*Primary Examiner* — Daryl Pope
(74) *Attorney, Agent, or Firm* — Rankin, Hill & Clark LLP

(57) ABSTRACT

A vehicle turn signal switch device whereby the production of knocking sounds by a cancellation pin when a steering wheel is turned in the direction of a turn signal is suppressed. A turn signal switch includes a fixed member and a movable plate. The cancellation pin, which is supported by the fixed member and the movable plate such that the cancellation pin can swing and move forward and backward relative to a cancellation cam, includes a sliding-contact surface that is in sliding contact with the fixed member. The cancellation pin is biased by a return spring in the direction of the cancellation cam and in the direction of the sliding contact of the sliding-contact surface with the fixed member.

15 Claims, 8 Drawing Sheets

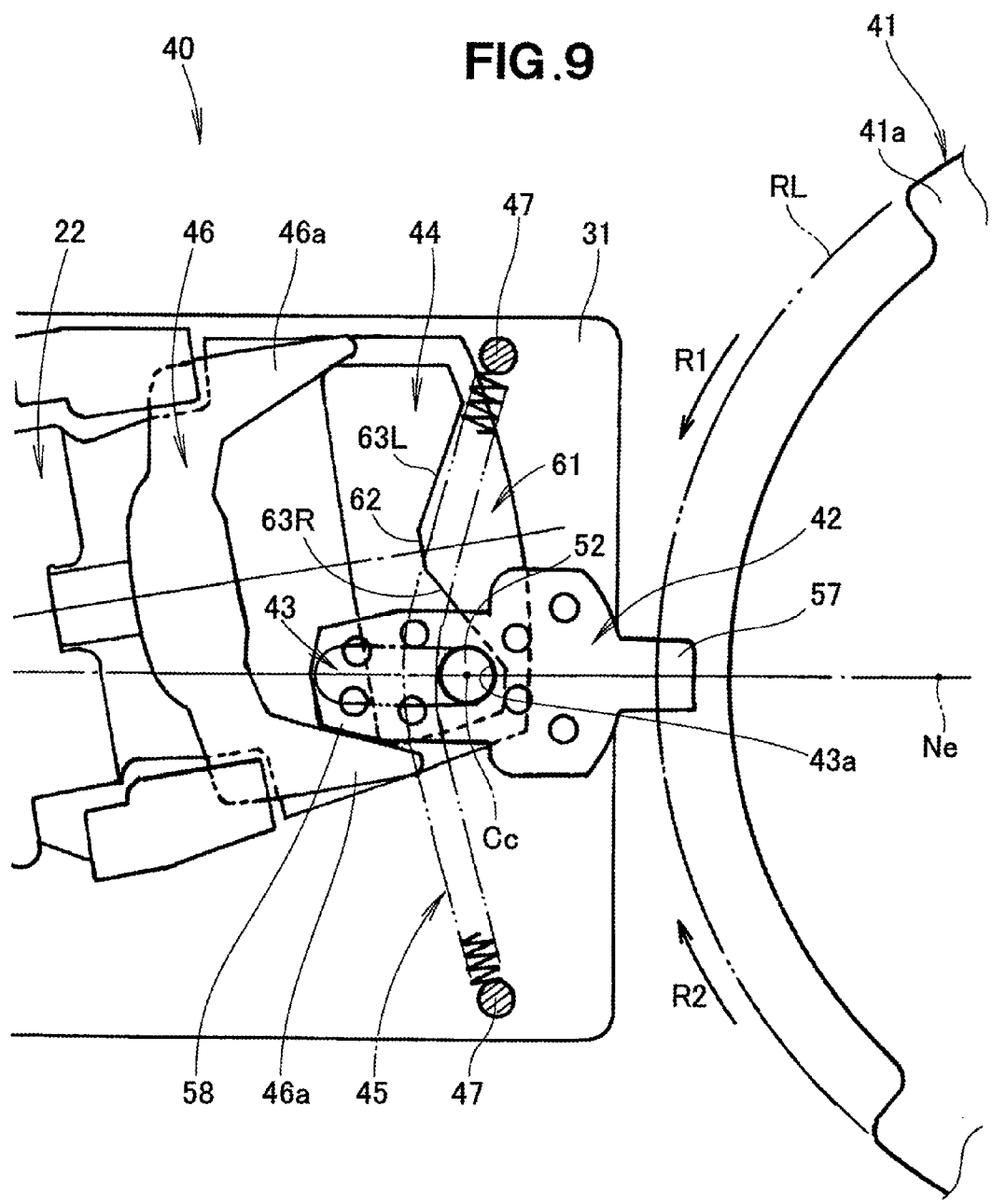

VEHICLE TURN SIGNAL SWITCH DEVICE

TECHNICAL FIELD

The present invention relates to a vehicular turn signal switch device.

BACKGROUND ART

A vehicular turn signal switch device is arranged such that by turning a steering wheel back into a turn signal cancellation direction, a cancellation pin is returned to its neutral position via a cancellation cam. Such a turn signal switch device is known from, for example, Patent Literature 1.

The turn signal switch device disclosed in Patent Literature 1 is comprised of a stationary member positioned in the vicinity of a steering shaft, a switch-mounted movable disk swingably supported on the stationary member, an operation lever for operating the movable disk, and a cancellation mechanism. The cancellation mechanism includes a cancellation cam rotatable in association with rotation of the steering shaft, and a cancellation pin supported by the stationary member and the movable disk. The cancellation pin is urged by a return spring in the form of a flat or leaf spring in a direction toward the cancellation cam.

The cancellation pin further includes a first shaft supported by a guide groove of the stationary member, and a second shaft supported by a cam groove of the movable disk. The guide groove is elongated in a direction toward the cancellation pin and guidedly supports the first shaft such that the cancellation pin is swingable and movable back and forth relative to the cancellation cam. The cam groove guidedly supports the second shaft such that the cancellation pin is shifted relative to the cancellation cam when the movable disk swung.

When the movable disk is swing-operated by the operation lever in a left-turn direction or a right-turn direction, the cancellation cam is shifted or displaced into a rotational track of the cancellation cam while being guided to the guide groove and the cam groove. At this time, the first shaft is urged by the leaf spring and shifted to a groove end, closer to the cancellation cam, of the guide groove. When the steering wheel is turned in the turn signal direction, the cancellation pin is pushed by the cancellation cam and oscillates and retreats slightly (makes an idle movement). Thereafter, by the urging force of the leaf spring, the cancellation pin is again shifted and comes back into the rotational track of the cancellation cam. At this time, by the urging force, the first shaft dashingly hits or collides with a groove end, closer to the cancellation pin, of the guide groove, thus producing hitting sounds. When hitting sounds are produced each time an idle movement is made, the sounds become noises that bar improvement of cabin habitability.

PRIOR ART LITERATURE

Patent Literature

Patent Literature 1: Japanese Patent Application Laid-Open Publication No. H11-219641 A

SUMMARY OF INVENTION

Technical Problem

It is an object of the present invention to provide a vehicular turn signal switch device that is capable of restraining generation of cancellation pin hitting sounds upon turning of a steering wheel in a turn signal direction.

Solution to Problem

According to an aspect of the present invention, there is provided a vehicular turn signal switch device, which comprises: a cancellation cam capable of rotation in association with rotation of a steering shaft; a movable disk swingably supported by a stationary member located in a vicinity of the cancellation cam; an operation lever for operating the movable disk; a switch adapted to be operated by the movable disk; and a cancellation pin swingably supported by the stationary member and the movable disk and capable of making advancing and retreating movements relative to the cancellation cam, wherein the cancellation pin has a slide-contact surface capable of slide-contact with the stationary member and is urged, by means of a return spring, both in a direction toward the cancellation cam and a direction in which the slide-contact surface comes into slide-contact with the stationary member, whereby, by turning a steering wheel in a turn signal cancellation direction to cause the cancellation pin to be returned to a neutral position, the movable disk is returned to the neutral position.

Preferably, as defined in claim 2, the return spring comprises a coil spring.

It is desirable that, as defined in claim 3, the coil spring have opposite ends anchored to anchoring parts positioned on opposite sides of a swing center line of the cancellation pin, and a central part hooked onto a spring hooking part of the cancellation pin, and the spring hooking part be positioned along the swing center line of the cancellation pin away from the stationary member relative to anchoring positions of the anchoring parts.

Preferably, as defined in claim 4, the slide-contact surface has a recessed part for storing grease.

It is preferable that, as defined in claim 5, the cancellation pin include a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk, the first and second shafts be positioned on a swing center line of the cancellation pin, the guide groove be adapted to guidedly support the first shaft so as to allow the cancellation pin to be swingable and capable of making advancing and retreating movements relative to the cancellation cam, the cam groove be adapted to guidedly support the second shaft so as to cause the cancellation pin to be shifted relative to the cancellation cam upon swinging of the movable disk, and a support length along which the first shaft is supported by the guide groove be set to be such a length that maintains the slide-contact surface wholly in a state of slide-contact with the stationary member.

Advantageous Effects of Invention

In the present invention, as defined in claim 1, the slide-contact surface of the cancellation pin is capable of slide-contact with the stationary member. In addition, the cancellation pin is urged by the return spring both in the direction toward the cancellation cam and the direction in which the slide-contact surface comes into slide-contact with the stationary member. The slide-contact surface applied with an urging force of the return spring is normally held in slide-contact with the stationary member. Thus, frictional resistance that arises upon shifting or displacement of the cancellation pin becomes large in proportionate to the degree of slide-contact of the slide-contact surface with the stationary member.

Upon turning of the steering wheel in a turn signal direction, the cancellation pin oscillates and restreats slightly (makes an idle movement). Thereafter, the cancellation pin is again shifted or displaced into the rotational track (locus) of the cancellation cam by the urging force of the return spring. At this time, because the resistance of friction between the stationary member and the slide-contact surface is large, the cancellation pin is shifted relatively slowly or gently. Consequently, it becomes possible to restrain generation of hitting sounds made by the cancellation pin hitting or colliding with other parts. This provides improved cabin habitability.

In the invention, as defined in claim 2, the coil spring has been employed as the return spring for urging the cancellation pin in both the direction toward the cancellation cam and the direction in which the slide-contact surface comes into slide-contact with the stationary member. This makes the resultant device simple in construction.

In the invention, as defined in claim 3, the spring hooking part is positioned along the swing center line of the cancellation pin away from the stationary member relative to anchoring positions of the two anchoring parts. This makes it possible to easily set the urging force in the direction in which the slide-contact surface comes into slide-contact with the stationary member. As a result, it becomes possible to easily set the frictional resistance between the stationary member and the slide-contact surface.

In the invention, as defined in claim 4, the recessed parts for storing grease are provided on the slide-contact surface. As a result, an oil film can be provided between the stationary member and the slide-contact surface for a prolonged time. This makes it possible to prevent frictional resistance between the stationary member and the slide-contact surface from becoming excessively large, thus enabling smooth slide-contact therebetween.

In the invention, as defined in claim 5, the support length along which the first shaft provided to the slide-contact surface of the cancellation pin is supported by the guide groove is set to be such a length that can maintain the slide-contact surface wholly in a state of slide-contact with the stationary member. The cam groove guides the second shaft so that the cancellation shaft is shifted relative to the cancellation cam. At this time, a load acts in the direction from the cam groove to the second shaft normally to the latter, or in the direction of the width of the guide groove. However, since the first shaft is sufficiently supported by the guide groove, the guide groove is restricted from inclining in the groove width direction. As a result, the slide-contact surface can be wholly maintained in the state of slide-contact with the stationary member. The frictional resistance between the stationary member and the slide-contact surface can be appropriately maintained. In addition, when the recessed parts are provided to the slide-contact surface, an oil film can be kept between the stationary member and the slide-contact surface for a prolonged time.

BRIEF DESCRIPTION OF THE DRAWINGS

FIG. 9 is an enlarged view of the cancellation mechanism of FIG. 8.

MODE FOR CARRYING OUT THE INVENTION

Referring now to the accompanying drawings, detailed discussions will be made as to a preferred embodiment of the present invention.

Embodiment

Description will now be made as to a vehicle turn signal device having a cancellation mechanism according to an embodiment of the present invention.

Figure 1:
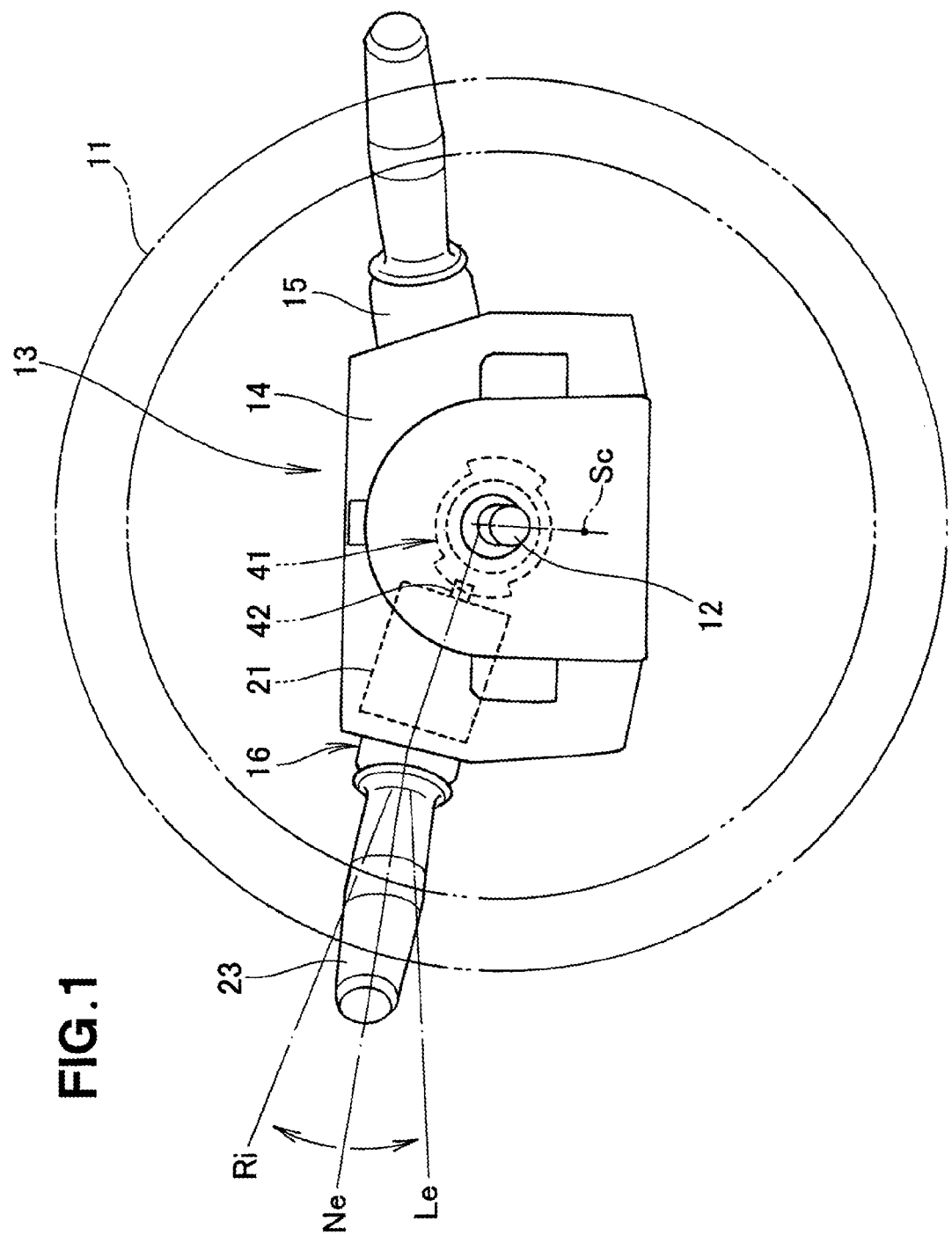
FIG. 1 is a view illustrating a vehicle turn signal switch device having a cancellation mechanism, according to the present invention, as seen from the side of a steering wheel.

As shown in FIG. 1, a combination switch unit 13 is disposed in the vicinity of a steering shaft 12 which is connected to a steering wheel 11 of a vehicle. The combination switch unit 13 is disposed on a steering column, not shown, and includes a common base 14 with a wiper switch device 15 provided on a right side and a turn signal switch device 16 provided on a left side.

The turn signal switch device 16 operates such that when an operation lever 23 is swung in an up-pulled direction from a neutral position Ne, the device generates a right-turn switch-on signal and when the operation lever 23 is swung in a down-pressed direction, the device generates a left-turn switch-on signal. In response to the right-turn switch-on signal, a right blinker (not shown) blinks. In response to the left-turn switch-on signal, a left blinker (not shown) blinks. The turn signal switch device 16 will be described in detail below.

Figure 2:
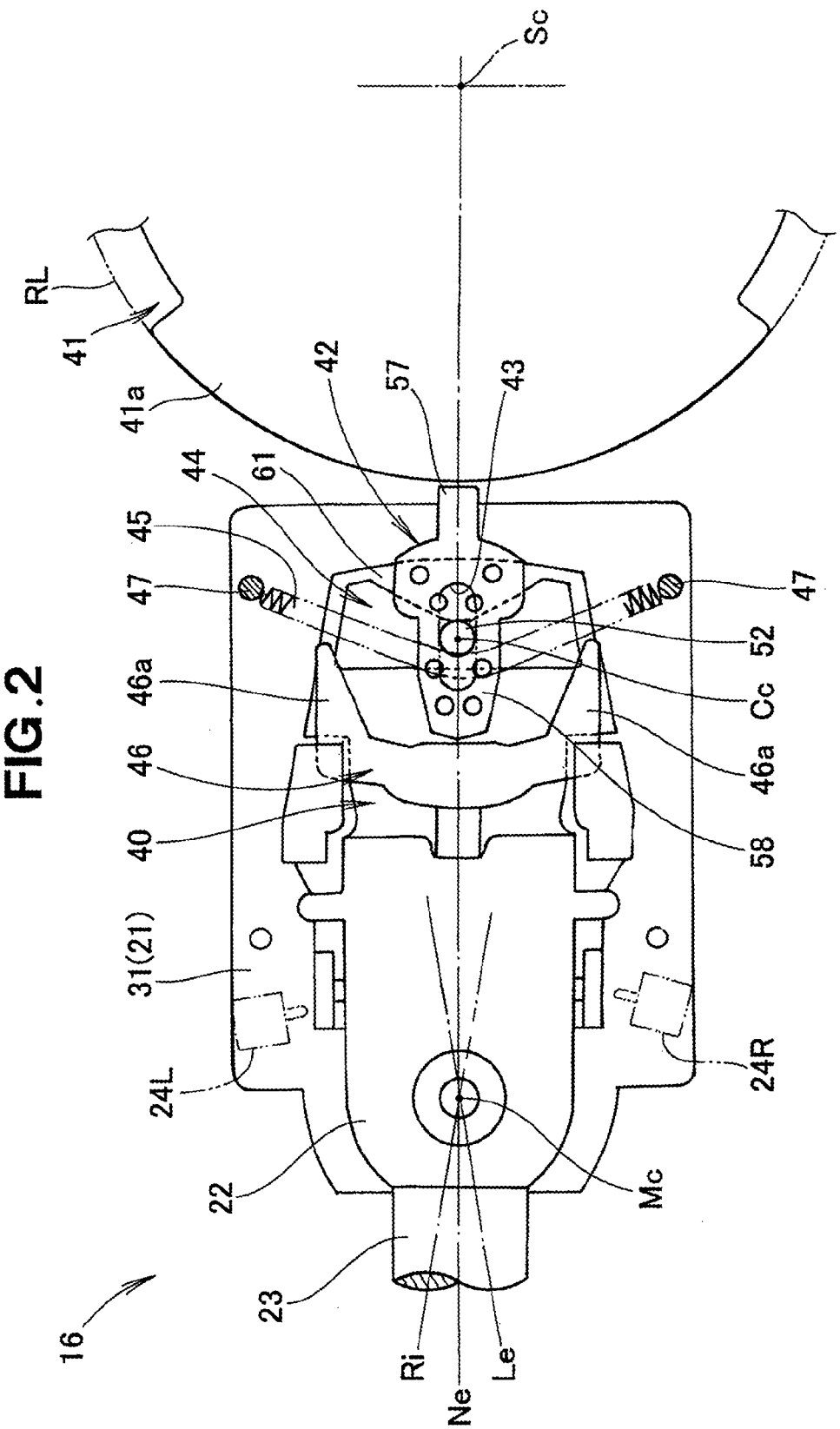
FIG. 2 is an overall view illustrating the turn signal switch device of FIG. 1, placed in a neutral position.

As shown in FIGS. 1 and 2, the turn signal switch 16 is comprised of a stationary member 21 attached to the common base 14, a movable disk 22 swingably supported on the stationary member 21, an operation lever 23 for operating the movable disk 22, and a pair of right and left switches 24R, 24L.

Figure 4:
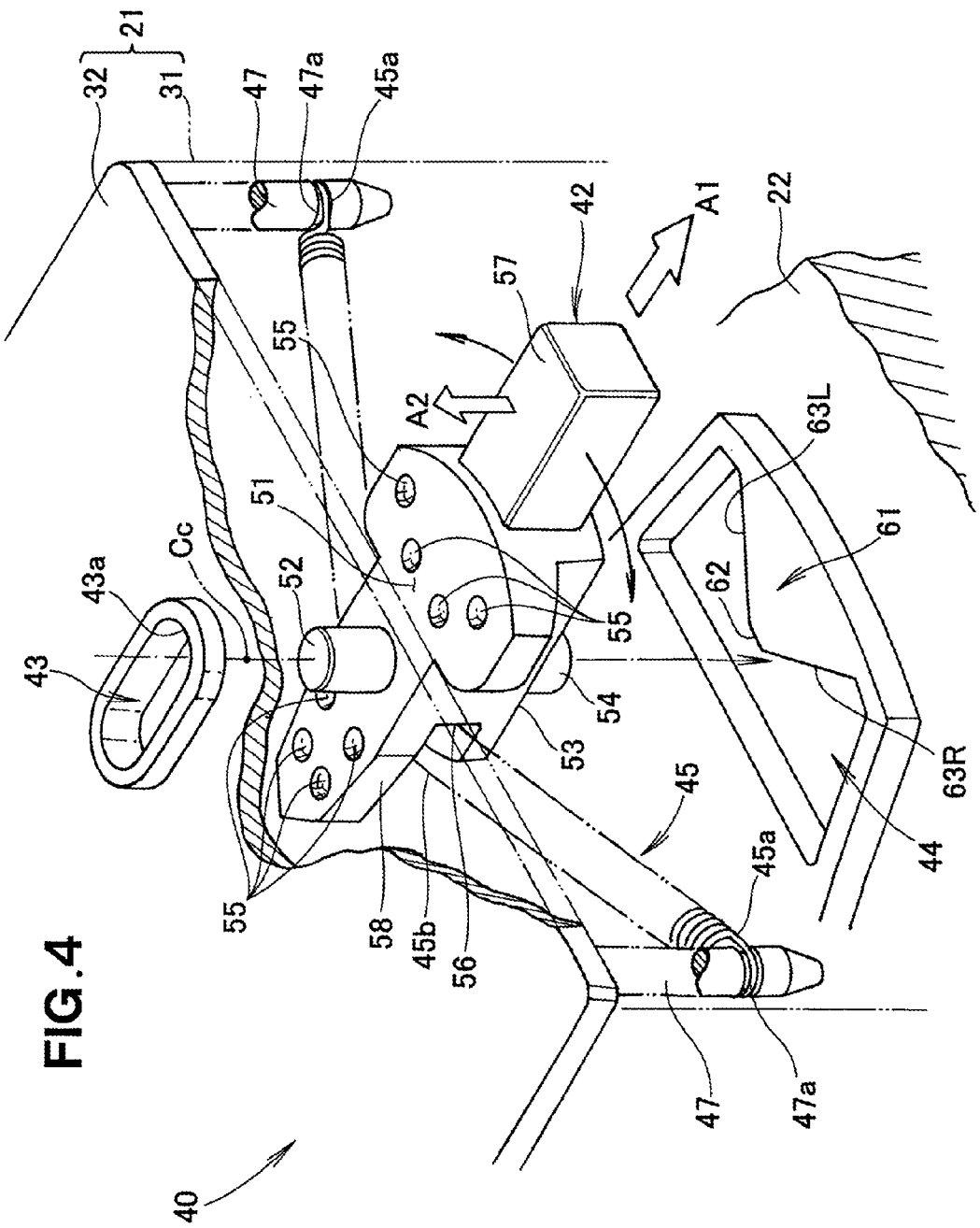
FIG. 4 is a perspective view illustrating the cancellation mechanism of FIG. 3.

As also shown in FIGS. 1 and 4, the stationary member 21 is comprised of a case 31 opened at a top thereof, and a lid 32 removably attached to the case 31 for closing the case 31. The movable disk 22 is swingably supported by the case 31 and the lid 32. The operation lever 23 is attached to the movable disk 22.

As shown in FIGS. 1 and 2, a line Ne that passes over a center Sc of the steering shaft 12 and over a swing center Mc of the movable disk 22 will hereinafter be called a reference line Ne. The reference line Ne will also be called a "neutral position Ne" where appropriate.

As can be appreciated from FIG. 2, when the movable disk 22 is placed on the reference line Ne or at the neutral position Ne, the switches 24R, 24L do not generate a switch-on signal. The right switch 24R generates a right-turn switch-on signal when the movable disk 22 is caused to swing to a right-turn position Ri by the operation lever 23. The left switch 24L generates a left-turn signal when the movable disk 22 is caused to swing to a left-turn position Le by the operation lever 23. When the movable disk 22 is returned to the neutral position Ne by the operation lever 23, each switch 24L, 24R no longer generates a switch-on signal.

The thus-arranged turn signal switch device 16 includes a cancellation mechanism 40 which in turn includes, as chief components, a cancellation cam 41, a cancellation pin 42, a guide groove 43, a cam groove 44, a return spring 45, and a cancellation plate 46.

The cancellation cam 41 is a member capable of rotation in association with the rotation of the steering shaft 12 (FIG. 1). More specifically, the cancellation cam 41 is an annular member which has a plurality of cam lobes 41a projecting outwardly from an outer peripheral surface thereof and is placed in a fitted engagement with the steering shaft 21 such that its relative rotation is restricted. The stationary member 21 is positioned proximately to the cancellation cam 41.

Figure 3:
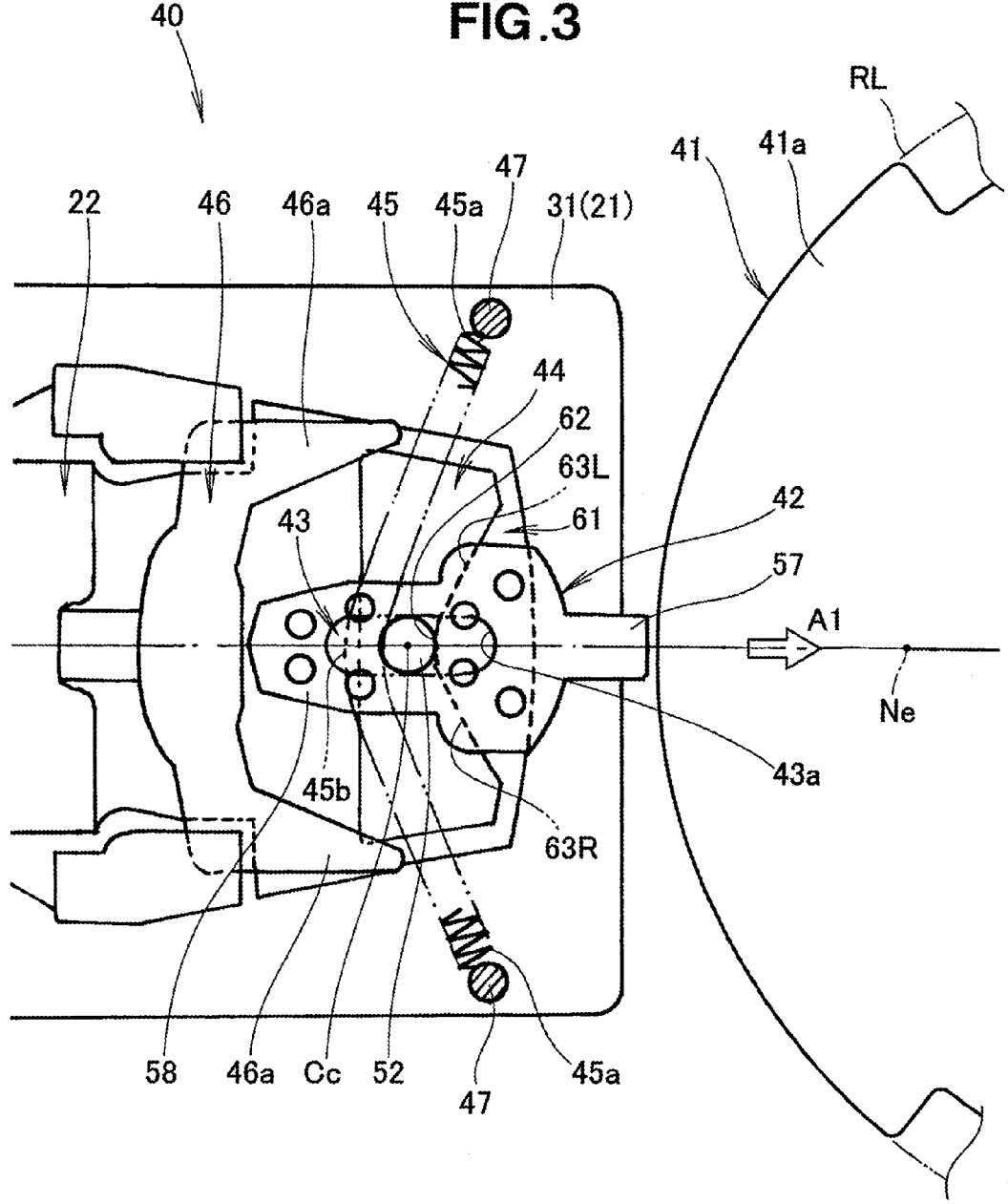
FIG. 3 is an enlarged view showing the cancellation mechanism of FIG. 2.
Figure 5:
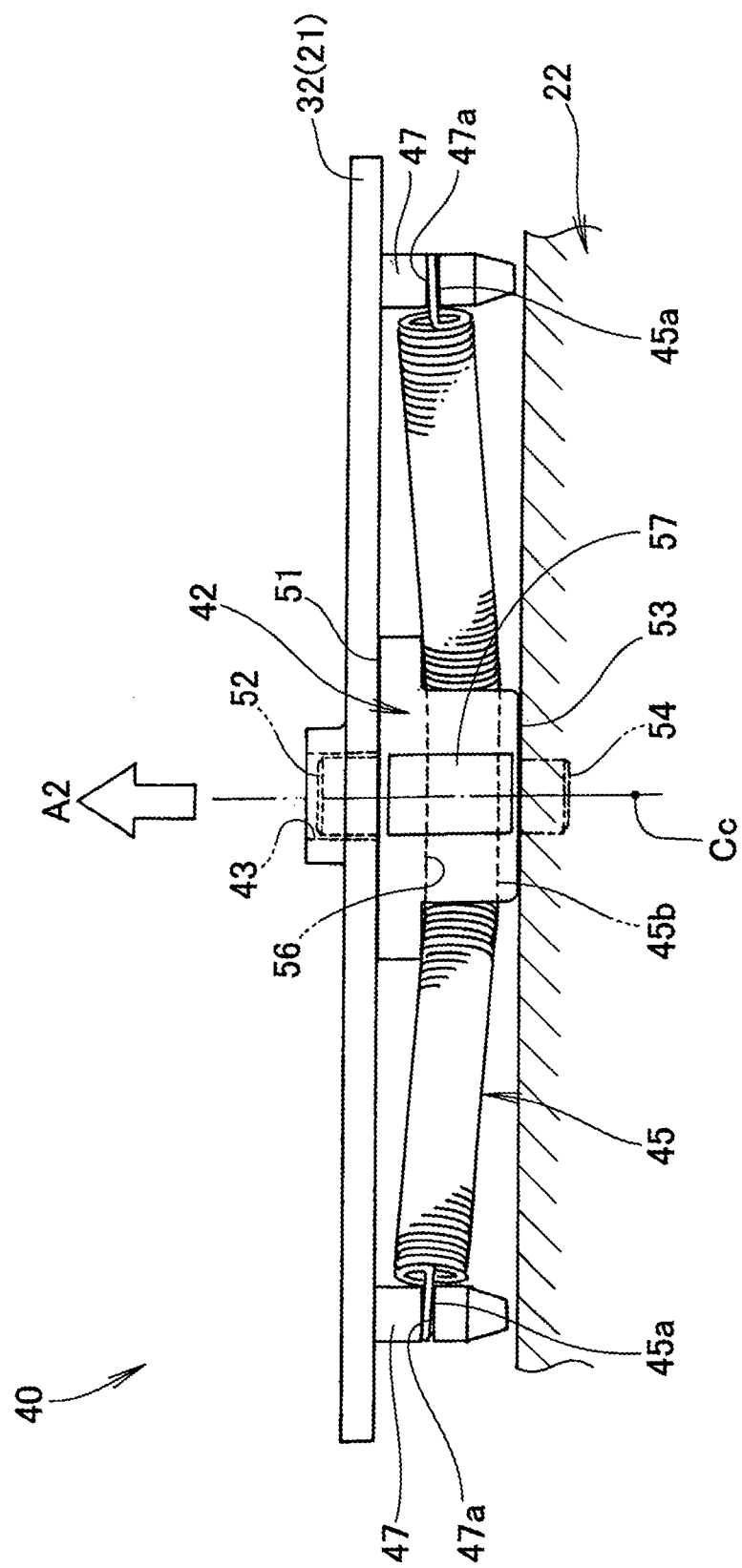
FIG. 5 is a view illustrating a relationship between a cancellation pin and a return spring of FIG. 4, as seen from a tip side of the cancellation pin.
Figure 6:
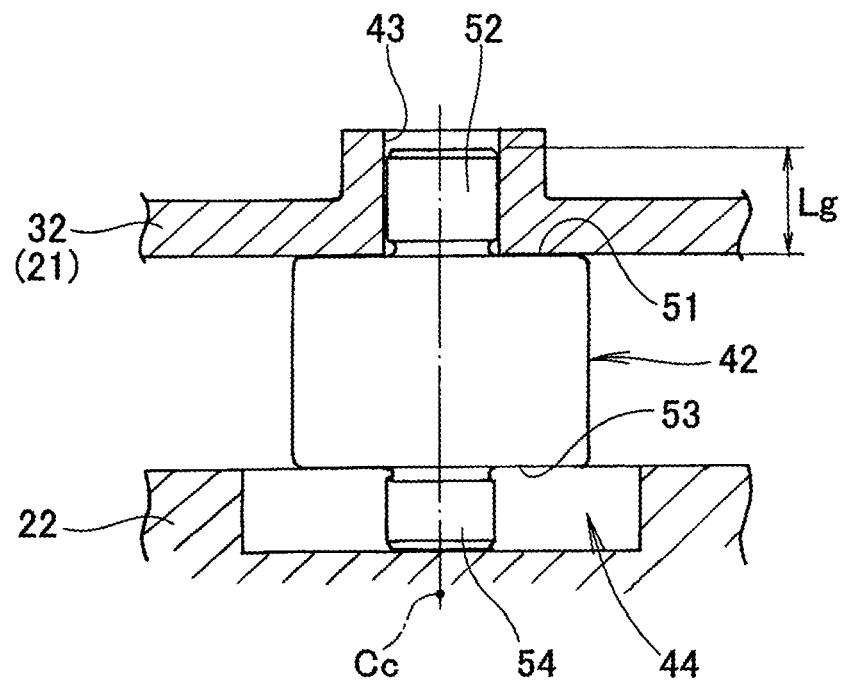
FIG. 6 is a cross-sectional view illustrating a support arrangement of a first shaft and a second shaft of the cancellation pin of FIG. 5.
Figure 7:
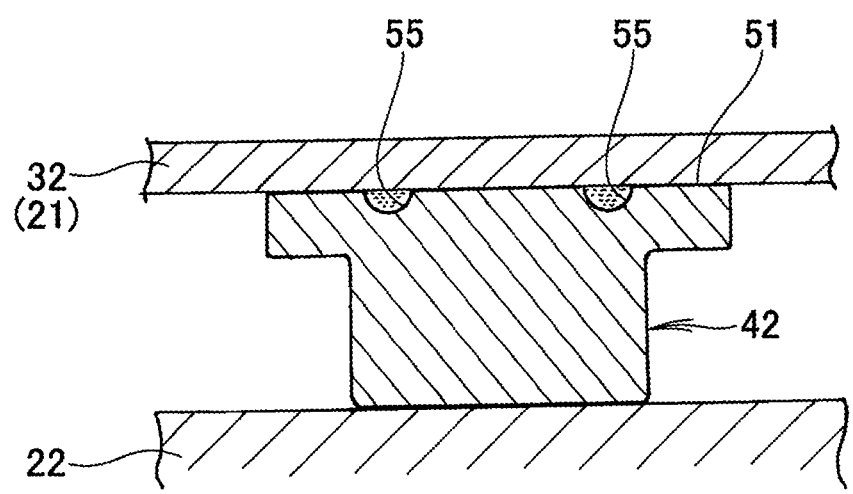
FIG. 7 is a cross-sectional view illustrating regions around recessed parts of the cancellation pin of FIG. 4.

As shown in FIGS. 2-4, the cancellation pin 42 is elongated along the reference line Ne and swingably supported by the stationary member 21 (particularly the lid 32 shown in FIG. 4) and the movable disk 22 and movable to and away from the cancellation cam 41. As shown in FIGS. 4-6, the cancellation pin 42 includes a slide-contact surface 51 held in slide contact with the stationary member 21 (particularly the lid 32), a first shaft 52 extending from the slide-contact surface 51 toward the stationary member 21 and supported by the guide groove 43, and a second shaft 54 extending from an anti-slide-contact surface 53, opposite from the slide-contact surface 51, toward the movable disk 22 and supported by the cam groove 44 of the movable disk 22. The first shaft 52 and the second shaft 54 are located on a swing center line Cc of the cancellation pin 42. As shown in FIGS. 4 and 7, the slide-contact surface 51 has one or more recessed parts 55 for storing grease.

As shown in FIGS. 3-6, the guide groove 43 is linearly elongated along the reference line Ne and formed in the stationary member 21 (particularly the lid 32). The guide groove 43 guidedly supports the first shaft 52 such that the cancellation pin 42 becomes swingable and capable of making advancing and retracting movements relative to the cancellation cam 41. Support length Lg (FIG. 6) along which the first shaft 52 is supported by the guide groove 43 is set to be such a length that the slide-contact surface 51 wholly held in a slide-contact state. The guide groove 43 may be an oblong hole that passes through the lid 32.

As shown in FIGS. 3 and 4, the cam groove 44 is formed on an upper surface of the movable disk 22 and serves as a guide groove that, as the movable disk 22 swung, guides the second shaft 54 so as to shift the cancellation pin 42 relative to the cancellation cam 41. More specifically, the guide groove 44 has a guide protrusion 61 protruding from a groove bottom. The guide protrusion 61, as viewed in a direction along the swing center line Cc of the cancellation pin 42, is formed into a substantially isosceles triangle having an apex or peak 62 located on the reference line Ne and faced oppositely from the cancellation cam 41 and two hypotenuses or sides inclined rightward and leftward (right side 63R and left side 63L).

As shown in FIGS. 3-5, by a single return spring 45, the cancellation pin 42 is urged in both direction A1 toward the cancellation cam 41 and in direction A2 in which the slide-contact surface 51 comes into sliding contact with the stationary member 21 (particularly an inner surface of the lid 32). The return spring 45 is comprised of a coil spring. Both ends 45a, 45a of the coil spring (return spring) 45 are hooked onto anchoring parts 47, 47 positioned on opposite sides of the swing center line Cc of the cancellation pin 42. A central part 45b of the coil spring 45 is hooked onto a spring hooking part 56 of the cancellation pin 42.

The cancellation pin 42 has a swing top end part 57 directed to the cancellation cam 41, and a swing rear end part 58 extending in a direction away from the swing top end part 57 with the swing center line Cc laid as a reference inbetween.

The spring hooking part 56 comprises a lateral groove formed in a swing rear end part 58. The lateral groove has a bottom on a side of a swing top end part 57 and is opened longitudinally of the groove (toward the two anchoring parts 47, 47). Further, the spring hooking part 56 is positioned away from the lid 32 of the stationary member 21 along the swing center line Cc of the cancellation pin 42 relative to hooking positions of the two anchoring parts 47, 47, as shown in FIG. 5. That is, a center part 45b of the return spring 45 is positioned further away from the inner surface of the lid 32 than the opposite ends 45a, 45a thereof. As a result, the cancellation pin 42 is urged in the direction A2 of slide-contact with the inner surface of the lid 32.

As shown in FIGS. 2 and 3, the cancellation plate 46 is positioned on a side of the swing center Mc of the movable disk 22 relative to the swing center line Cc of the cancellation pin 42 and is formed on the movable disk 22. More specifically, the cancellation plate 46, as viewed in a direction along the swing center line Cc of the cancellation pin 42, is formed on the reference line Ne into a substantially U-shape opening on a side of the cancellation cam 41. Right and left arms 46a, 46a of the cancellation plate 46 are provided in spaced relation to the swing rear end part 58 of the cancellation pin 42 on right and left sides of the pin 42.

Next, an operation of the cancellation mechanism 40 will be described.

As the movable disk 22 is positioned at the neutral position Ne, as shown in FIGS. 2-4, the second shaft 54 (FIG. 4) of the cancellation pin 42 is positioned at the peak 62 of the guide protrusion 61. Thus, the swing top end part 57 of the cancellation pin 42 is positioned out of a track of rotation RL of the cancellation cam 41. The movable disk 22 is maintained at the neutral position Ne by means of a click mechanism, not shown. The click mechanism is resiliently engaged between the movable disk 22 and the case 31 and goes out of engagement by a predetermined small load.

Figure 8:
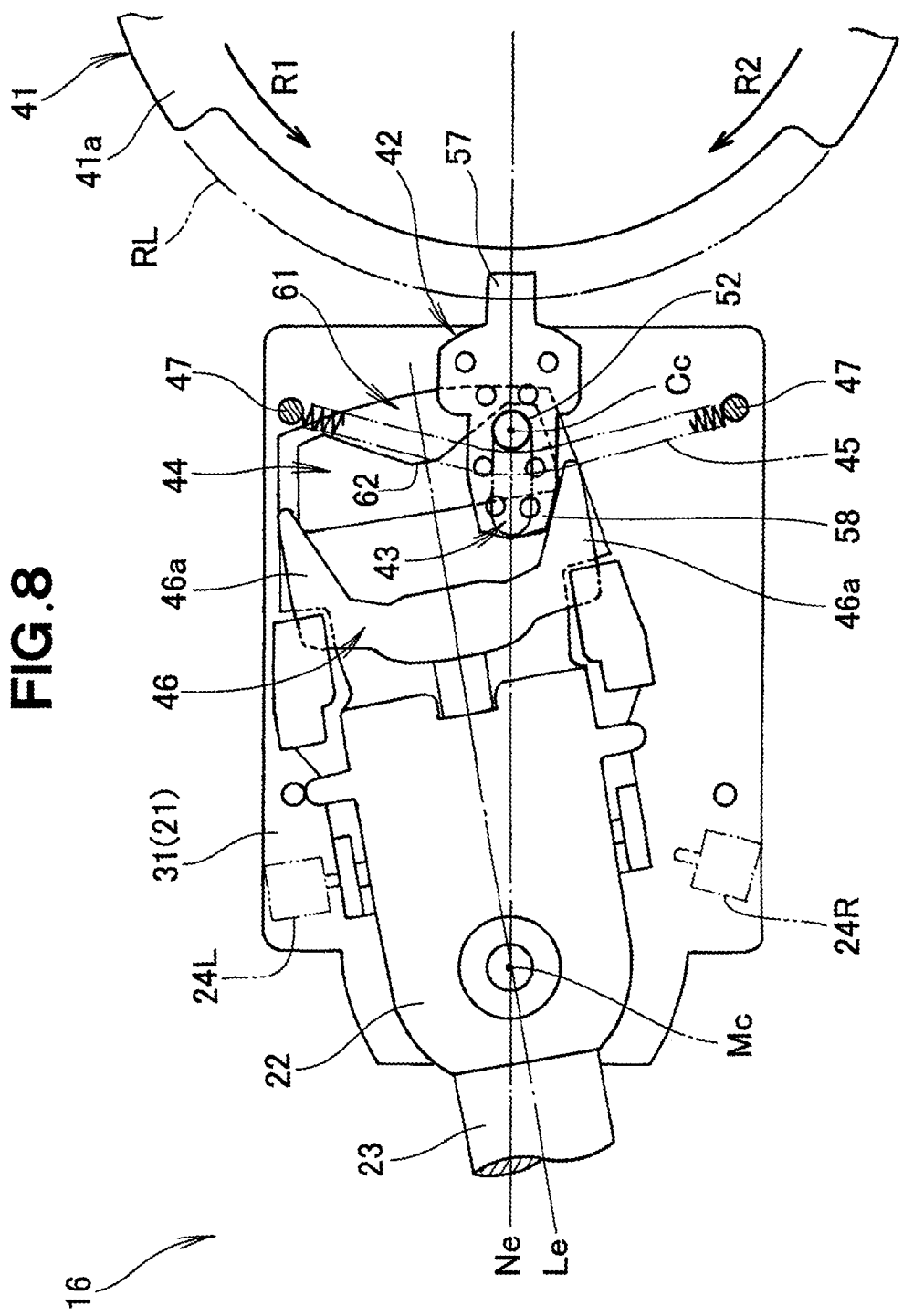
FIG. 8 is a view illustrating the turn signal switch device of FIG. 2, placed in a left-turn condition.

Then, as shown in FIGS. 8 and 9, when the movable disk 22 is swing-operated to the left-turn position be by, for example, the operation lever 23, the second shaft 54 (FIG. 4) of the cancellation pin 42 moves away from the apex of the guide protrusion 61. As a result, the swing top end part 57 of the cancellation pin 42 is displaced or shifted into the rotational track RL of the cancellation cam 41. At this time the first shaft 52 is shifted to a groove end 43a close to the cancellation cam 41 of the guide groove 43 and stays still there.

Thereafter, when the steering wheel 11 (FIG. 1) is steered in a turn signal direction R1, the cancellation pin 42 oscillates and retreats slightly or makes a so-called idle movement because the swing top end part 57 is pushed by the cancellation cam 41. Then, by the urging force of the return spring 45, the cancellation pin 41 is again brought into the rotational track (locus) RL of the cancellation cam 41. By this urging force, the first shaft 52 attempts to dashingly abut against (collide with) a groove end 43a, close to the cancellation cam 41, of the guide groove 43.

In contrast, the slide-contact surface 51 of the cancellation pin 42 can be brought into slide-contact with the lid 32 of the stationary member 21. In addition, by the return spring 45, the cancellation pin 42 is urged both in a direction A1 toward the cancellation cam 41 and in a direction A2 of slide-contact of the slide-contact surface 51 with the lid 32. The slide-contact surface 51 applied with the urging force of the return spring 45 is normally held in slide-contact with the lid 32. With the slide-contact surface 51 thus held in slide-contact with the lid 32, frictional resistance upon shifting of the cancellation pin 42 becomes large.

Because the frictional resistance between the lid 32 and the slide-contact surface 51 is large, the cancellation pin 42 can be shifted relatively slowly. As a result, it becomes possible to keep hitting sounds made by the cancellation pin 42 hitting or colliding with other parts to a minimum. This provides improved cabin habitability. Note also that by the single return spring 45, urging in both directions, namely, the direction A1 toward the cancellation cam 41 and the direction A2 of slide-contact of the slide-contact surface 51 with the lid 32 is achieved. Generation of hitting sounds can thus be restrained by the cancellation mechanism 40 which is reduced in the number of component parts and simple in construction.

Thereafter, as shown in FIGS. 8 and 9, by turning the steering wheel 11 toward a turn signal cancelling direction R2, the cancellation cam 41 causes the cancellation pin 42 to return to the neutral position Ne. Thus, the swing rear end part 58 of the cancellation pin 42 pushes one arm 46a of the cancellation plate 46 to thereby cause the movable disk 22 to return to the neutral position Ne.

The above-described arrangement may be summarized as below.

A coil spring has been adopted as the return spring that urges the cancellation pin 42 in the direction A1 toward the cancellation cam 41 and the direction A2 of slide-contact of the slide-contact surface 51 with the lid 32, thus rendering the return spring simple in construction.

It should also be noted that, as shown in FIG. 5, the spring hooking part 56 is positioned on and along the swing center Cc of the cancellation pin 42 and away from the stationary member lid 32 having anchoring parts 47, 47 at opposite ends. This enables easy production of an urging force in the direction A2 of sliding-contact of the slide-contact surface 51 with the inner surface of the lid 32. As a result, a desired frictional resistance can easily be set between the inner surface of the lid 32 and the slide-contact surface 51.

It should additionally be noted that, as shown in FIGS. 4 and 7, the slide-contact surface 51 is provided with the recessed parts 55 for storing grease. Thus, it becomes possible to form and keep for a prolonged time an oil film between the inner surface of the lid 32 and the slide-contact surface 51. Thus, the frictional resistance between the inner surface of the lid 32 and the slide-contact surface will not become excessively large.

It should further be noted that, as shown in FIGS. 3, 4 and 6, the support length Lg along which the first shaft 52 provided to the slide-contact surface 51 of the cancellation pin 42 is set to be such a length that the slide-contact surface 51 as an entirety can be maintained in a slide-contact state relative to the lid 32. As the movable member 22 swung, the cam groove 44 guides the second shaft 54 so as to shift the cancellation pin 42 relative to the cancellation cam 41. At this time, a load acts in a direction from the cam groove 44 normal to the second shaft 54, that is, in a groove width direction of the guide groove 43.

However, the first shaft 52 is sufficiently supported by the guide groove 43, whereby the guide groove 43 is restrained from being inclined in the groove width direction. As a result, the slide-contact surface 51 as an entirety is maintained in a state of slide-contact with the inner surface of the lid 32. The frictional resistance between the inner surface of the lid 32 and the slide-contact surface 51 can be appropriately maintained. Further, by virtue of the recessed parts 55 (FIG. 7) formed in the slide-contact surface 51 for storing grease, an oil film can be maintained for a prolonged time between the inner surface of the lid 32 and the slide-contact surface 51.

The invention shall not be construed to limit the stationary member 21 to the combination of the case 31 and the lid 32. The stationary member 21 may be a single member, for example. Similarly, the slide-contact surface 51 of the cancellation pin 42 should not be construed to be limited to the arrangement of slide-contact relative to the inner surface of the lid 32. For example, the slide-contact may be relative to the inner surface of the case 31.

Further, the return spring may not be limited to a single one but may be provided in plurality. Stated otherwise, the cancellation pin 42 may be sufficient if it is arranged to be urged, by a single return spring or plural return springs, in both the direction A1 toward the cancellation cam 41 and the slide-contact direction A2 of the slide-contact surface 51 with the stationary member 21, particularly the inner surface of the lid 32.

The single coil spring or return spring 45 can be replaced by two tension springs, for example. In this instance, members corresponding to the two anchoring parts 47, 47, namely, two substitute members, may be provided to the swing rear end part 58 of the cancellation pin 42, as shown in FIGS. 3-5, in place of the spring hooking part 56. Then, two tension springs may be hooked between the two substitute members provided to the swing rear end part 58 and the two anchoring parts 47, 47 provided to the stationary member 21. Spring hooking positions for the substitute members may be positioned away from the lid 32 of the stationary member 21 along the swing center line Cc relative to respective anchoring positions 47a, 47a of the anchoring parts 47, 47.

In arrangement explained above, owing to the two tension springs, the cancellation pin 42 is urged in both direction A1 toward the cancellation cam 41 and direction A2 in which the slide-contact surface 51 comes into slide-contact with the stationary member 21, particularly the inner surface of the lid 32.

Industrial Applicability

The cancellation mechanism 40 according to the present invention is particularly suitable for application to various types of vehicular turn signal switch devices.

Reference Signs List

11 . . . steering wheel; 12. steering shaft; 16 . . . vehicular turn signal switch device; 21 . . . stationary member; 22 . . . movable disk; 23 . . . operation lever; 24L, 24R . . . switches; 31 . . . case (part of the stationary member); 32 . . . lid (part of the stationary member); 40 . . . cancellation mechanism; 41 . . . cancellation cam; 42 . . . cancellation pin; 43 . . . guide groove; 43a . . . groove end proximate to the guide groove of the cancellation cam; 44 . . . cam groove; 45 . . . return spring (coil spring); 45a . . . opposite ends of the coil spring; 45b . . . central part of the coil spring; 47 . . . anchoring part; 17a . . . anchoring positions of the anchoring parts; 51 . . . slide-contact surface; 52 . . . first shaft; 53 . . . anti-slide-contact surface; 54 . . . second shaft; 55 . . . recessed part; 56 . . . spring hooking part; 57 . . . swing top end part; A1 . . . direction toward the cancellation cam; A2 . . . direction in which the slide-contact surface comes into slide-contact with the stationary member; Cc . . . swing center line of the cancellation pin; Lg . . . support length along which the first shaft is supported by the guide groove; Ne . . . neutral position; RL . . . rotational track (locus) of the cancellation cam.

The invention claimed is:

1. A vehicular turn signal switch device comprising:
   a cancellation cam capable of rotation in association with rotation of a steering shaft;
   a movable disk swingably supported by a stationary member located in a vicinity of the cancellation cam;
   an operation lever for operating the movable disk;
   a switch adapted to be operated by the movable disk;
   a cancellation pin having a slide-contact surface capable of slide-contact with the stationary member and swingably supported by the stationary member and the movable disk and capable of making advancing and retreating movements relative to the cancellation cam; and
   a return-spring means urging the cancellation pin in a direction toward the cancellation cam;
   wherein the return-spring means also urges the cancellation pin in a direction in which the slide-contact surface comes into slide-contact with the stationary member,
   whereby, by turning a steering wheel in a turn signal cancellation direction to cause the cancellation pin to be returned to a neutral position, the movable disk is returned to the neutral position.

2. The vehicular turn signal switch device of claim 1, wherein the return-spring means comprises a coil spring.

3. The vehicular turn signal switch device of claim 2, wherein
   the coil spring has opposite ends anchored to anchoring parts positioned on opposite sides of a swing center line of the cancellation pin, and a central part hooked onto a spring hooking part of the cancellation pin, and
   the spring hooking part is positioned along the swing center line of the cancellation pin away from the stationary member relative to anchoring positions of the anchoring parts.

4. The vehicular turn signal switch device of claim 1, wherein the slide-contact surface has a recessed part for storing grease.

5. The vehicular turn signal switch device of claim 1, wherein
   the cancellation pin includes a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk,
   the first and second shafts are positioned on a swing center line of the cancellation pin,
   the guide groove is adapted to guidedly support the first shaft so as to allow the cancellation pin to be swingable and capable of making advancing and retreating movements relative to the cancellation cam,
   the cam groove is adapted to guidedly support the second shaft so as to cause the cancellation pin to be shifted relative to the cancellation cam upon swinging of the movable disk, and
   a support length along which the first shaft is supported by the guide groove is set to be such a length that maintains the slide-contact surface wholly in a state of slide-contact with the stationary member.

6. The vehicular turn signal switch device of claim 2, wherein
   the cancellation pin includes a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk,
   the first and second shafts are positioned on a swing center line of the cancellation pin,
   the guide groove is adapted to guidedly support the first shaft so as to allow the cancellation pin to be swingable and capable of making advancing and retreating movements relative to the cancellation cam,
   the cam groove is adapted to guidedly support the second shaft so as to cause the cancellation pin to be shifted relative to the cancellation cam upon swinging of the movable disk, and
   a support length along which the first shaft is supported by the guide groove is set to be such a length that maintains the slide-contact surface wholly in a state of slide-contact with the stationary member.

7. The vehicular turn signal switch device of claim 3, wherein
   the cancellation pin includes a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk,
   the first and second shafts are positioned on the swing center line of the cancellation pin,
   the guide groove is adapted to guidedly support the first shaft so as to allow the cancellation pin to be swingable and capable of making advancing and retreating movements relative to the cancellation cam,
   the cam groove is adapted to guidedly support the second shaft so as to cause the cancellation pin to be shifted relative to the cancellation cam upon swinging of the movable disk, and
   a support length along which the first shaft is supported by the guide groove is set to be such a length that maintains the slide-contact surface wholly in a state of slide-contact with the stationary member.

8. The vehicular turn signal switch device of claim 4, wherein
   the cancellation pin includes a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk,
   the first and second shafts are positioned on a swing center line of the cancellation pin,
   the guide groove is adapted to guidedly support the first shaft so as to allow the cancellation pin to be swingable and capable of making advancing and retreating movements relative to the cancellation cam,
   the cam groove is adapted to guidedly support the second shaft so as to cause the cancellation pin to be shifted relative to the cancellation cam upon swinging of the movable disk, and
   a support length along which the first shaft is supported by the guide groove is set to be such a length that maintains the slide-contact surface wholly in a state of slide-contact with the stationary member.

9. A vehicular turn signal switch device comprising:
   a cancellation cam capable of rotation in association with rotation of a steering shaft;
   a movable disk swingably supported by a stationary member located in a vicinity of the cancellation cam;

an operation lever for operating the movable disk;
a switch adapted to be operated by the movable disk;
a cancellation pin having a slide-contact surface capable of slide-contact with the stationary member and swingably supported by the stationary member and the movable disk and capable of making advancing and retreating movements relative to the cancellation cam; and
a return-spring means urging the cancellation pin in a direction toward the cancellation cam,
wherein the return-spring means also urges the cancellation pin in a direction in which the slide-contact surface comes into slide-contact with the stationary member, so that, by turning a steering wheel in a turn signal cancellation direction to cause the cancellation pin to be returned to a neutral position, the movable disk is returned to the neutral position,
the return-spring comprises a coil spring,
the coil spring has opposite ends anchored to anchoring parts positioned on opposite sides of a swing center line of the cancellation pin, and a central part hooked onto a spring hooking part of the cancellation pin, and
the spring hooking part is positioned along the swing center line of the cancellation pin away from the stationary member relative to anchoring positions of the anchoring parts.

10. The vehicular turn signal switch device of claim 9, wherein the slide-contact surface has a recessed part for storing grease.

11. The vehicular turn signal switch device of claim 9, wherein
the cancellation pin includes a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk,
the first and second shafts are positioned on the swing center line of the cancellation pin,
the guide groove is adapted to guidedly support the first shaft so as to allow the cancellation pin to be swingable and capable of making advancing and retreating movements relative to the cancellation cam,
the cam groove is adapted to guidedly support the second shaft so as to cause the cancellation pin to be shifted relative to the cancellation cam upon swinging of the movable disk, and
a support length along which the first shaft is supported by the guide groove is set to be such a length that maintains the slide-contact surface wholly in a state of slide-contact with the stationary member.

12. A vehicular turn signal switch device comprising:
a cancellation cam capable of rotation in association with rotation of a steering shaft;
a movable disk swingably supported by a stationary member located in a vicinity of the cancellation cam;
an operation lever for operating the movable disk;
a switch adapted to be operated by the movable disk;
a cancellation pin having a slide-contact surface capable of slide-contact with the stationary member and swingably supported by the stationary member and the movable disk and capable of making advancing and retreating movements relative to the cancellation cam; and
a return-spring means urging the cancellation pin in a direction toward the cancellation cam,
wherein the return-spring means also urges the cancellation pin in a direction in which the slide-contact surface comes into slide-contact with the stationary member, so that, by turning a steering wheel in a turn signal cancellation direction to cause the cancellation pin to be returned to a neutral position, the movable disk is returned to the neutral position,
the cancellation pin includes a first shaft extending from the slide-contact surface toward the stationary member and supported by a guide groove of the stationary member, and a second shaft extending from an anti-slide-contact surface on an opposite side of the slide-contact surface toward the movable disk and supported by a cam groove of the movable disk,
the first and second shafts are positioned on a swing center line of the cancellation pin,
the guide groove is adapted to guidedly support the first shaft so as to allow the cancellation pin to be swingable and capable of making advancing and retreating movements relative to the cancellation cam,
the cam groove is adapted to guidedly support the second shaft so as to cause the cancellation pin to be shifted relative to the cancellation cam upon swinging of the movable disk, and
a support length along which the first shaft is supported by the guide groove is set to be such a length that maintains the slide-contact surface wholly in a state of slide-contact with the stationary member.

13. The vehicular turn signal switch device of claim 12, wherein the return-spring means comprises a coil spring.

14. The vehicular turn signal switch device of claim 13, wherein
the coil spring has opposite ends anchored to anchoring parts positioned on opposite sides of the swing center line of the cancellation pin, and a central part hooked onto a spring hooking part of the cancellation pin, and
the spring hooking part is positioned along the swing center line of the cancellation pin away from the stationary member relative to anchoring positions of the anchoring parts.

15. The vehicular turn signal switch device of claim 12, wherein the slide-contact surface has a recessed part for storing grease.

* * * * *